(12) United States Patent
Feuerstack et al.

(10) Patent No.: US 9,425,723 B2
(45) Date of Patent: Aug. 23, 2016

(54) SYSTEM COMPRISING AN ELECTRICALLY EXCITED MACHINE

(75) Inventors: Peter Feuerstack, Ludwigsburg (DE); Erik Weissenborn, Stuttgart (DE); Martin Kessler, Schwaebisch Gmuend (DE)

(73) Assignee: Robert Bosch GmbH, Stuttgart (DE)

( * ) Notice: Subject to any disclaimer, the term of this patent is extended or adjusted under 35 U.S.C. 154(b) by 289 days.

(21) Appl. No.: 13/984,311

(22) PCT Filed: Dec. 29, 2011

(86) PCT No.: PCT/EP2011/074244
§ 371 (c)(1),
(2), (4) Date: Aug. 23, 2013

(87) PCT Pub. No.: WO2012/107150
PCT Pub. Date: Aug. 16, 2012

(65) Prior Publication Data
US 2013/0320888 A1 Dec. 5, 2013

(30) Foreign Application Priority Data
Feb. 10, 2011 (DE) .................. 10 2011 003 940

(51) Int. Cl.
*H02P 1/24* (2006.01)
*H02P 6/14* (2016.01)
(Continued)

(52) U.S. Cl.
CPC .............. *H02P 6/14* (2013.01); *B60L 11/1803* (2013.01); *H02J 7/0024* (2013.01); *H02J 7/0065* (2013.01); *H02J 7/1492* (2013.01); *H02M 7/49* (2013.01); *H02J 2007/0059* (2013.01); *H02J 2007/0067* (2013.01); *H02M 2007/4835* (2013.01);
(Continued)

(58) Field of Classification Search
CPC ..... H02P 27/08; H02P 23/08; H02M 7/53875
USPC ..................................... 318/727, 801, 803
See application file for complete search history.

(56) References Cited

U.S. PATENT DOCUMENTS 3,316,479 A * 4/1967 Frierdich ................ H02P 9/107
322/25
3,681,658 A * 8/1972 Naoi ..................... F02N 11/105
290/37 A (Continued)

FOREIGN PATENT DOCUMENTS

| CN | 1947026 | 4/2007 |
|---|---|---|
| DE | 1110031 | 6/1961 |

(Continued)

OTHER PUBLICATIONS

International Search Report for Application No. PCT/EP2011/074244 dated Mar. 26, 2013 (2 pages).

*Primary Examiner* — Rina Duda
(74) *Attorney, Agent, or Firm* — Michael Best & Friedrich LLP

(57) ABSTRACT

A system includes an n-phase separately excited electrical machine, wherein n≥1, and a controllable first energy store that has n parallel energy supply branches. Every energy supply branch includes a first connection that is connected to a respective phase connection of the electrical machine, and a second connection that is connected to a common reference bus. The reference bus is connected to a neutral point of the electrical machine via an exciter winding of the electrical machine.

12 Claims, 2 Drawing Sheets

(51) Int. Cl.
  *H02J 7/00* (2006.01)
  *H02J 7/14* (2006.01)
  *B60L 11/18* (2006.01)
  *H02M 7/49* (2007.01)
  *H02M 7/483* (2007.01)

(52) U.S. Cl.
  CPC ........... *H02P2209/01* (2013.01); *Y02E 10/766* (2013.01); *Y02T 10/642* (2013.01); *Y02T 10/7005* (2013.01); *Y02T 10/7055* (2013.01); *Y02T 10/92* (2013.01)

(56) References Cited

U.S. PATENT DOCUMENTS

| | | | | |
|---|---|---|---|---|
| 5,631,544 A | * | 5/1997 | Syverson | H02J 7/1438 322/46 |
| 5,710,699 A | * | 1/1998 | King et al. | 363/132 |
| 6,058,032 A | * | 5/2000 | Yamanaka et al. | 363/71 |
| 6,711,037 B2 | * | 3/2004 | Odachi et al. | 363/98 |
| 7,098,624 B2 | * | 8/2006 | Kusaka | 318/727 |
| 7,733,038 B2 | * | 6/2010 | Franke | 318/105 |
| 8,035,934 B2 | * | 10/2011 | Inoue et al. | 361/31 |
| 2012/0234124 A1 | * | 9/2012 | Nozaki et al. | 74/473.12 |

FOREIGN PATENT DOCUMENTS

| | | |
|---|---|---|
| DE | 1936969 | 2/1970 |
| DE | 102010027857 | 10/2001 |
| DE | 102010027861 | 10/2011 |
| EP | 0907238 | 4/1999 |
| JP | 2003180080 | 6/2003 |

* cited by examiner

SYSTEM COMPRISING AN ELECTRICALLY EXCITED MACHINE

BACKGROUND OF THE INVENTION

The invention relates to a system having an electrically excited machine, which is controlled and is supplied with electrical energy by means of a controllable first energy store, and to a method for operating the system of the invention.

The trend is that in the future electronic systems which combine new energy store technologies with electrical drive technology will be used increasingly both in stationary applications, for instance wind power plants, and in vehicles, such as hybrid or electric vehicles. In conventional applications, as shown in FIG. 1 for example, an electric machine 101 which is in the form of a polyphase machine, for example, is controlled by means of a converter in the form of a pulse-controlled inverter 102. A characteristic of systems of this type is a so-called DC voltage intermediate circuit 103 via which an energy store 104, generally a traction battery, is connected to the DC voltage side of the pulse-controlled inverter 102. In order to be able to meet the requirements placed on power and energy for a respective application, a plurality of battery cells 105 are connected in series. Since the current provided by an energy store 104 of this type must flow through all battery cells 105 and a battery cell 105 can only conduct a limited current, battery cells are often additionally connected in parallel to increase the maximum current.

The series connection of a plurality of battery cells entails the problem, in addition to a high total voltage, that the entire energy store fails when a single battery cell fails because then no battery current can flow any more. Such a failure of the energy store can lead to a failure of the entire system. In the case of a vehicle, a failure of the drive battery can cause the vehicle to "break down". In other applications, for instance the rotor blade adjustment of wind power plants, hazardous situations may even arise in the event of unfavorable boundary conditions, for instance a strong wind. Therefore, a high degree of reliability of the energy store is always desired, where "reliability" is intended to mean the capacity of a system to operate fault-free for a predetermined time.

In the earlier applications DE 102010027857.2 and DE 102010027861.0, batteries having a plurality of battery module strings have been described which can be connected directly to an electric machine. In this case the battery module strings have a plurality of series-connected battery modules, wherein each battery module has at least one battery cell and an associated controllable coupling unit, which makes it possible, depending on control signals, to interrupt the respective battery module string or to bypass the respectively associated at least one battery cell or to connect the respectively associated at least one battery cell into the respective battery module string. By suitably actuating the coupling units, for example with the aid of pulse-width modulation, it is also possible for suitable phase signals for controlling the electric machine to be provided with the result that a separate pulse-controlled inverter is not required. The pulse-controlled inverter required for controlling the electric machine is therefore integrated in the battery, so to speak. For the purposes of the disclosure, these two earlier applications are incorporated in full in the present application.

In contrast to conventional systems, a constant DC voltage which can be used for example to supply an exciter winding of a separately excited electric machine is not available at the output of the battery system.

SUMMARY OF THE INVENTION

In accordance with one embodiment, the present invention provides a system having an n-phase separately excited electric machine, wherein $n \geq 1$, a controllable first energy store, which has n parallel energy supply branches, wherein each of the energy supply branches has a first terminal, which is connected in each case to a phase terminal of the electric machine, and a second terminal, which is connected in each case to a common reference rail, wherein the reference rail is connected to the star point of the electric machine via an exciter winding of the electric machine.

In accordance with another embodiment, the present invention provides a method for operating a system having an n-phase separately excited electric machine, wherein $n \geq 1$, and a controllable first energy store, which has n parallel energy supply branches. The method comprises the steps of providing a DC voltage component to each of the energy supply branches, feeding the DC voltage component into the phase terminals of the n-phase electric machine, and supplying an exciter winding of the electric machine with the DC voltage component fed into the phase terminals in order to generate an excitation field in the electric machine.

One concept of the present invention is to supply an exciter winding of a separately excited electric machine via the star point of the electric machine. As a result of this, the exciter winding can be interconnected with the star point inside the electric machine, and so an external motor connection in the system of the invention is no longer required. Here, all of the components necessary for the operation of the electric machine are already present in the energy storage module and so no further components are necessary for supplying the exciter winding.

A further concept of the present invention is to change the potential in the star point of an electric machine by means of a simple actuation of energy storage modules in the energy supply branches, in order to be able to vary the current through the exciter winding of the electric machine and therefore to change the excitation of the machine. The method of actuation can easily be integrated into existing actuation concepts for actuating the stator windings of the electric machine.

According to an advantageous embodiment, a system can have at least two series-connected energy storage modules in each of the n parallel energy supply branches, which energy storage modules comprise in each case at least one electrical energy storage cell having an associated controllable coupling unit. In this case, the coupling units can be configured in full-bridge circuit connection or in half-bridge circuit connection, depending on whether or not a reversal of the current direction in the energy supply branches is desired. Some of the series-connected energy storage modules can be controlled via the coupling units in such a way that a direct current component is applied to the output supply voltage in each of the energy supply branches. Said direct current component can then be fed into the exciter winding via the phase terminals and the star point of the electric machine. As a result, the potential in the star point can be varied in steps. By means of appropriate clocking of at least one energy storage module, the potential at the star point can also be steplessly adjusted.

BRIEF DESCRIPTION OF THE DRAWINGS

Further features and advantages of embodiments of the invention arise from the following description.

DETAILED DESCRIPTION

Figure 1:
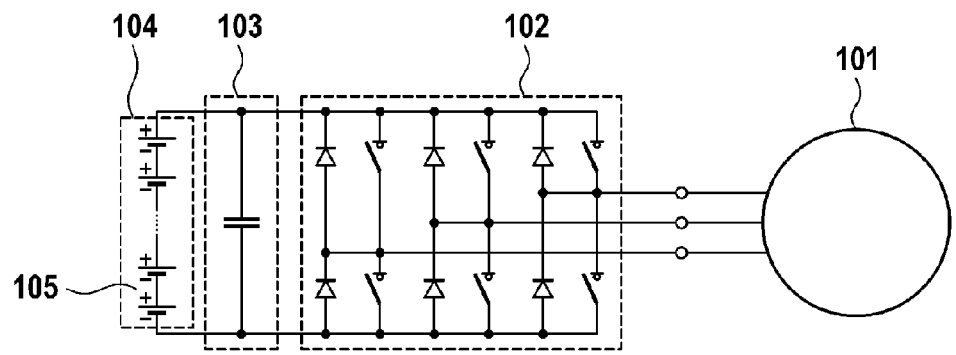
FIG. 1 shows a schematic illustration of a system having an electric machine from the prior art.
Figure 2:
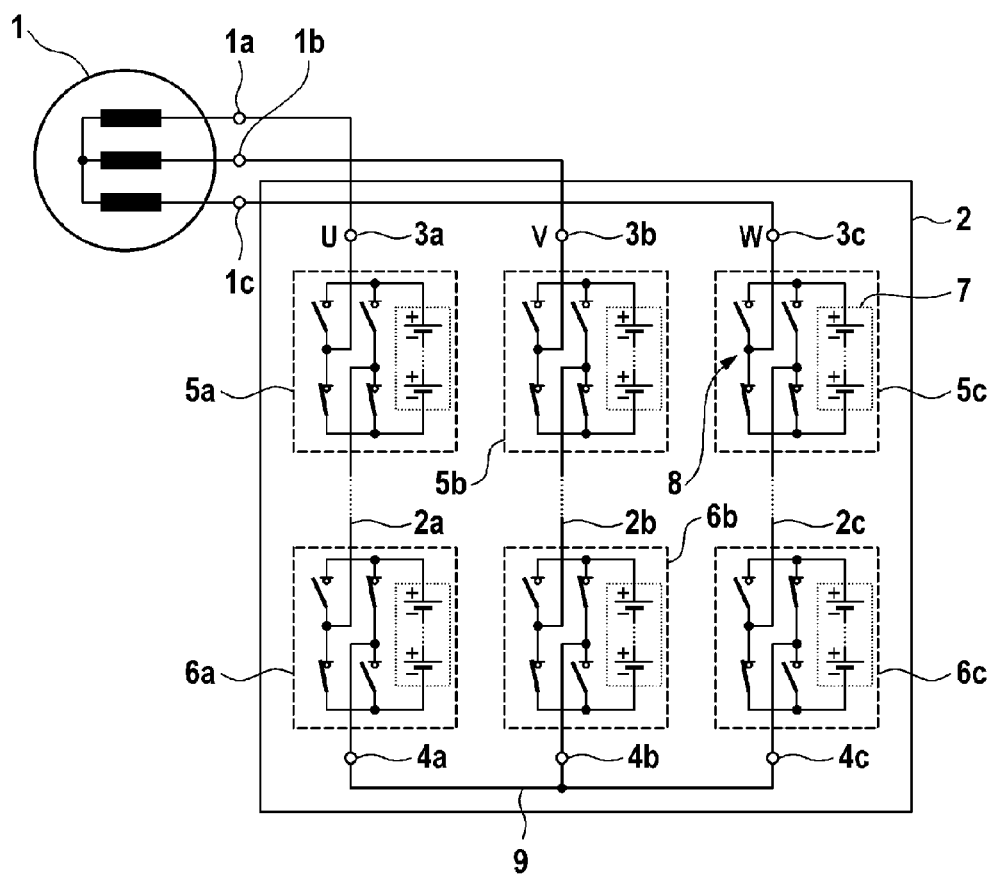
FIG. 2 shows a schematic illustration of a system having an electric machine and a controllable energy store.

FIG. 2 shows a system having an electric machine 1 and a controllable energy store 2. The electric machine 1 is illustrated as a three-phase electric machine 1 by way of example, which is supplied with energy via a controllable first energy store 2. The controllable first energy store 2 comprises three energy supply branches 2a, 2b, 2c, which are connected on one side to a reference potential 9 (reference rail), which, in the illustrated embodiments, carries a medium potential with respect to the phases U, V and W of the electric machine 1, via terminals 4a, 4b, 4c and on the other side in each case to the individual phases U, V, W of the electric machine 1. In this case, a terminal 3a of a first energy supply branch 2a is coupled to a first phase terminal 1a of the electric machine 1, a terminal 3b of a second energy supply branch 2b is coupled to a second phase terminal 1b of the electric machine 1 and a terminal 3c of a third energy supply branch 2c is coupled to a third phase terminal 1c of the electric machine 1. Each of the energy supply branches 2a, 2b, 2c has series-connected energy storage modules 5a, 6a or 5b, 6b or 5c, 6c. By way of example, the number of energy storage modules per energy supply branch 2a, 2b, 2c in FIG. 2 is two, wherein any other number of energy storage modules is also possible, however.

The energy storage modules 5a, 5b, 5c, 6a, 6b, 6c in turn comprise in each case a plurality of series-connected electrical energy storage cells in an energy storage cell unit 7. In this case, the number of energy storage cells in an energy storage cell unit 7 in FIG. 2 is two, for example, wherein any other number of energy storage cells is also possible, however. The energy storage modules 5a, 5b, 5c, 6a, 6b, 6c also comprise in each case a coupling unit 8 which is associated with the energy storage cells 7 of the respective energy storage module 5a, 5b, 5c, 6a, 6b, 6c. For reasons of clarity, the coupling units and the energy storage cell units are only provided with reference signs in the energy storage module 5c. However, it is clear that the energy storage modules 5a, 5b, 6a, 6b, 6c can comprise similar coupling units and energy storage cell units.

In the illustrated variant embodiments, the coupling units 8 are in each case formed by four controllable switching elements, which are interconnected in the form of a full bridge. The switching elements can be configured as power semiconductor switches here, for example in the form of IGBTs (insulated gate bipolar transistors) or as MOSFETs (metal oxide semiconductor field-effect transistors). However, it is also possible to form the coupling units 8 in each case as half-bridge circuits with only two switching elements in each case. Half-bridge circuits afford the advantage of having lower power losses owing to the lower number of switching elements, however they have the disadvantage that the polarity of the voltage at the output terminals 3a, 3c of the energy supply branches cannot be reversed.

In the case, illustrated by way of example, of a full-bridge circuit, the coupling units 8 make it possible to interrupt the respective energy supply branch 2a, 2b, 2c by opening all of the switching elements of a coupling unit 8. Alternatively, the energy storage cells 7 can be either bypassed or switched into the respective energy supply branch 2a, 2b, 2c by closing in each case two of the switching elements of a coupling unit 8.

The total output voltages of the energy supply branches 2a, 2b, 2c are determined by the respective switching state of the controllable switching elements of the coupling units 8 and can be adjusted in steps. The stepwise adjustment results depending on the voltage of the individual energy storage modules 5a, 5b, 5c, 6a, 6b, 6c.

The coupling units 8 therefore make it possible to connect the phases U, V and W of the electric machine 1 either relative to a high reference potential or relative to a low reference potential and to this extent can also perform the function of a known inverter. Thus, the power and mode of operation of the electric machine 1 can be controlled by the controllable first energy store 2 given suitable actuation of the coupling units 8. The controllable first energy store 2 therefore performs a dual function to this extent since it is used firstly for electrical energy supply and secondly also for controlling the electric machine 1.

The electric machine 1 has stator windings which are mutually interconnected in a star connection in a known manner. The electric machine 1 is embodied as a three-phase AC machine in the illustrated exemplary embodiments; however, it can also have fewer or more than three phases. The number of energy supply branches 2a, 2b, 2c in the controllable first energy store 2 accordingly depends on the number of phases of the electrical machine.

Figure 3:
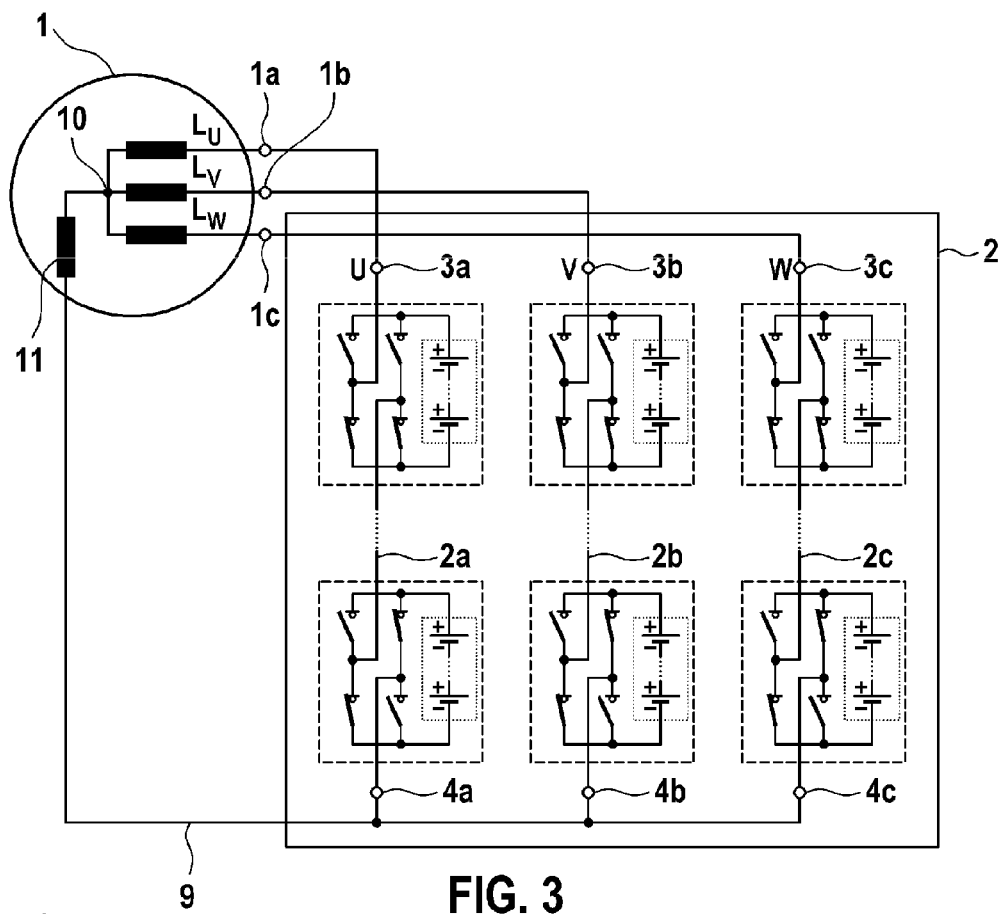
FIG. 3 shows a schematic illustration of a system having an electric machine and a controllable energy store according to an embodiment of the present invention.

FIG. 3 shows a schematic illustration of a system having an electric machine 1 and a controllable energy store 2 according to one embodiment of the present invention. The system illustrated in FIG. 3 differs from the system illustrated in FIG. 2 merely in that an exciter winding 11 is connected at a star point 10 of the electric machine 1, said exciter winding in turn being connected in each case to the terminals 4a, 4b, 4c of the controllable energy store 2 via the reference rail 9.

In the event of conventional actuation of the controllable first energy store 2, a medium potential is present at the star point 10. However, said potential can be shifted by in each case the energy storage cells 7 of one or more energy storage modules 5a, 5b, 5c, 6a, 6b, 6c of each energy supply branch 2a, 2b, 2c being switched with positive or negative polarity into the respective energy supply branch 2a, 2b, 2c by means of appropriate actuation of the associated coupling units 8 with continuous or clocked operation. The voltages at the energy supply branches 2a, 2b, 2c are thus increased or decreased in each case to a value which is above or below a voltage value which is required at that time for supplying energy to the electric machine 1.

By means of said increase or decrease of the voltages at the energy supply branches 2a, 2b, 2c, a DC voltage component can be fed into the star point 10 via the phase terminals 1a, 1b, 1c and so the potential at the star point 10 can be changed. A variable current can be conducted through the exciter winding 11 via the feedback coupling of the star point 10 with the reference rail 9 of the controllable energy store 2 and so a variable excitation field can be generated in the electric machine 1. By means of this interconnection, which can occur inside the electric machine, a separate motor connection for supplying the exciter winding 11 is no longer necessary.

In the present exemplary embodiment according to FIG. 3, a reversal of polarity of the current through the exciter winding 11 can be achieved with the full-bridge circuit of the coupling units 8 by means of an appropriate actuation of the energy storage modules 5a, 5b, 5c, 6a, 6b, 6c. However, it is also possible, for example, to implement each of the energy storage modules 5a, 5b, 5c, 6a, 6b, 6c with coupling units 8 in a half-bridge circuit. If said energy storage modules are used to provide the DC voltage component to the phase terminals 1a, 1b, 1c, it is then no longer possible to effect a reversal of polarity of the current through the exciter winding, however the power losses at the switching elements of said energy storage modules are reduced owing to the lower number of required switching elements in a half-bridge circuit of the coupling units 8.

Figure 4:
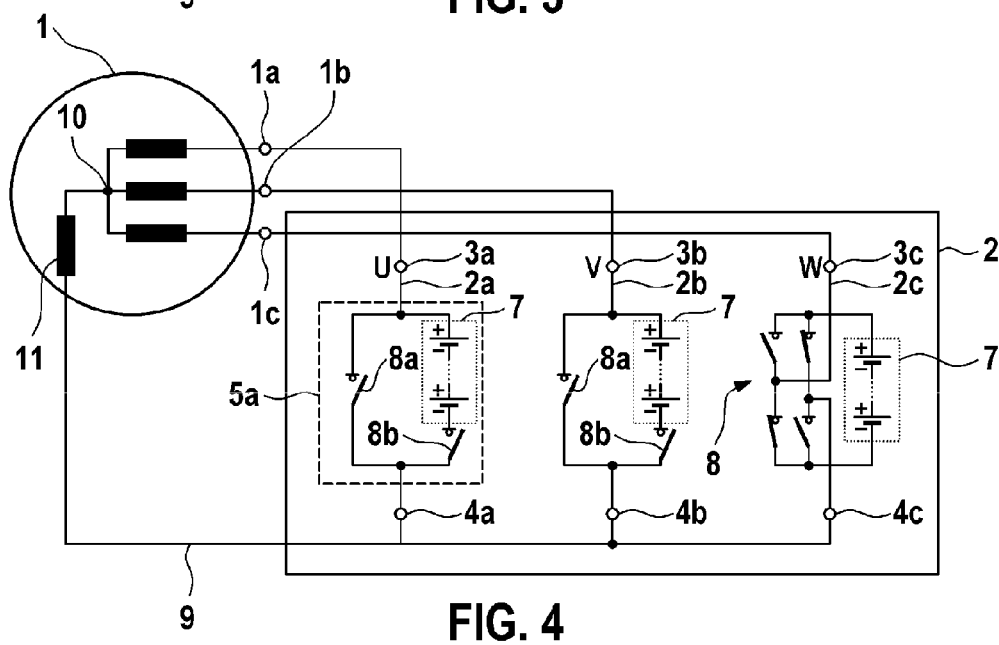
FIG. 4 shows a schematic illustration of a system having an electric machine and a controllable energy store according to another embodiment of the present invention.

FIG. 4 shows a schematic illustration of a system having an electric machine and a controllable energy store according to another embodiment of the present invention. The system according to FIG. 4 differs from the system according to FIG. 3 substantially in that each of the energy supply branches 2a, 2b, 2c only has one energy storage module. Furthermore, coupling units and energy storage cells 7 are provided in the energy storage modules of the energy supply branches 2a, 2b, 2c, which coupling units and energy storage cells are associated with the respective energy storage modules. By way of example, the energy storage module 5a with coupling units 8a and 8b and an energy storage cell unit 7 is illustrated in the energy supply branch 2a. In FIG. 4, the energy storage cell unit 7 can be connected and/or bypassed by means of a half-bridge circuit with the terminals 3a and/or 4a. For this purpose, a coupling unit 8a is located in a branch in parallel with the energy storage cell unit 7 and a coupling unit 8b is connected in series in the branch of the energy storage cell unit 7. As is also illustrated in FIG. 4, it is possible in principle for each of the energy storage modules to be configured with different coupling units, for example with coupling units in half-bridge circuit connection and coupling units in full-bridge circuit connection. However, it is obviously also possible to configure all energy storage modules in FIG. 4 with coupling units in half-bridge circuit connection.

The invention claimed is:

1. A system comprising:
an n-phase separately excited electric machine, wherein $n \geq 1$;
a controllable first energy store, which has n parallel energy supply branches, wherein each of the energy supply branches has a first terminal, which is connected in each case to a phase terminal of the electric machine, and a second terminal, which is connected in each case to a common reference rail, and an exciter winding that is connected to a star point of the electric machine and to the common reference rail to conduct current between the star point of the electric machine and the common reference rail, wherein the exciter winding receives current only via the star point of the electric machine.

2. The system as claimed in claim 1, wherein the potential at the star point of the electric machine is changed by increasing or decreasing voltages at the energy supply branches.

3. The system as claimed in claim 1, wherein each of the n parallel energy supply branches has at least two series-connected energy storage modules, which in each case comprise at least one electrical energy storage cell having an associated controllable coupling unit.

4. The system as claimed in claim 1, wherein as the exciter winding is connected directly between the star point of the electric machine and the common reference rail to conduct current.

5. The system as claimed in claim 1, wherein the system is free from an external motor connection.

6. The system as claimed in claim 1, wherein the exciter winding is directly connected to the common reference rail.

7. The system as claimed in claim 1, wherein the exciter winding is only provided energy by the first energy store.

8. A method for operating a system having an n-phase separately excited electric machine, wherein $n \geq 1$, and a controllable first energy store, which has n parallel energy supply branches, the method comprising:
providing a DC voltage component to each of the energy supply branches;
feeding the DC voltage component into the phase terminals of the n-phase electric machine; and
supplying an exciter winding via a star point of the electric machine with the DC voltage component fed into the phase terminals in order to generate an excitation field in the electric machine,
wherein the exciter winding only receives the DC voltage component via the star point.

9. The method as claimed in claim 8, wherein each of the energy supply branches of the first energy store has at least two series-connected energy storage modules, which in each case comprise at least one electrical energy storage cell having an associated controllable coupling unit, and wherein providing the DC voltage component involves connecting at least one of the energy storage modules into the respective energy supply branch.

10. The method as claimed in claim 8, wherein the exciter winding generates the excitation field in the electric machine, and the exciter winding is connected to a common reference rail of the electric machine, the exciter winding conducting current between the star point and the common reference rail.

11. The method as claimed in claim 8, including
providing each of the energy supply branches with first terminals connected to a corresponding phase terminal of the n-phase electric machine, and
providing each of the energy supply branches with second terminals connected to a common reference rail, and
providing the common reference rail connected to the exciting winding of the electric machine.

12. A system comprising:
an n-phase separately excited electric machine, wherein $n \geq 1$;
a controllable first energy store, which has n parallel energy supply branches, wherein each of the energy supply branches has a first terminal, which is connected in each case to a phase terminal of the electric machine, and a second terminal, which is connected in each case to a common reference rail, and an exciter winding that is connected to a star point of the electric machine and to the common reference rail to conduct current between the star point of the electric machine and the common reference rail, wherein one end of the exciter winding is connected directly to the star point of the electric machine and another end of the exciter winding is connected directly to the common reference rail, and wherein the exciter winding is only provided energy by the first energy store.

* * * * *